US012587046B2

(12) United States Patent
Borsai et al.

(10) Patent No.: US 12,587,046 B2
(45) Date of Patent: Mar. 24, 2026

(54) STATOR WITH TEETH SKEWED FROM THE ROTATION AXIS

(71) Applicant: Minebea Mitsumi Inc., Nagano (JP)

(72) Inventors: Peter Borsai, Tuttlingen (DE);
Giovanni Biancuzzi, Freiburg (DE)

(73) Assignee: Mineba Mitsumi Inc., Nagano (JP)

( * ) Notice: Subject to any disclaimer, the term of this patent is extended or adjusted under 35 U.S.C. 154(b) by 229 days.

(21) Appl. No.: 18/458,281

(22) Filed: Aug. 30, 2023

(65) Prior Publication Data

US 2024/0097507 A1     Mar. 21, 2024

(30) Foreign Application Priority Data

Sep. 5, 2022     (DE) ..................... 10 2022 122 468.6
Aug. 29, 2023     (DE) ..................... 10 2023 123 166.9

(51) Int. Cl.
*H02K 1/14*          (2006.01)
*H02K 37/16*          (2006.01)
(52) U.S. Cl.
CPC ............. *H02K 1/143* (2013.01); *H02K 37/16* (2013.01)
(58) Field of Classification Search
CPC ........ H02K 1/143; H02K 1/148; H02K 1/165; H02K 37/16; H02K 21/16
USPC ............... 310/49.01, 49.24, 49.35, 216.021, 310/216.022, 216.071, 216.073, 216.097
See application file for complete search history.

(56) References Cited

U.S. PATENT DOCUMENTS

| | | | | | |
|---|---|---|---|---|---|
| 4,554,471 | A | * | 11/1985 | Bertram | ............... H02K 21/185 310/49.33 |
| 5,619,086 | A | | 4/1997 | Steiner | |
| 5,880,551 | A | * | 3/1999 | Prudham | ............... H02K 37/14 310/156.43 |
| 8,339,003 | B2 | | 12/2012 | Prudham | |
| 2011/0031824 | A1 | * | 2/2011 | Prudham | ............... H02K 21/14 310/48 |
| 2013/0076195 | A1 | * | 3/2013 | Li | ........................... H02K 21/16 310/216.097 |
| 2014/0305246 | A1 | * | 10/2014 | Tsai | ....................... H02K 16/00 310/112 |

FOREIGN PATENT DOCUMENTS

| | | |
|---|---|---|
| CH | 291010 A | 5/1953 |
| WO | 97/21 266 A1 | 6/1997 |

OTHER PUBLICATIONS

German Search Report mailed Jul. 24, 2023 issued in corresponding German Patent Application No. 10 2022 122 468.8 (and English translation).
German Search Report mailed Oct. 16, 2024 issued in corresponding German Patent Application No. 102023123166.9 (and English translation).

\* cited by examiner

*Primary Examiner* — Michael Andrews
(74) *Attorney, Agent, or Firm* — Posz Law Group, PLC

(57) ABSTRACT

A stator, in particular for an electric machine, has a stator pack including a rotor receiving region configured to receive a rotor configured to be driven around a rotation axis within the rotor receiving region, and including at least one stator pole tooth which is surrounded by a coil surrounding a coil central axis and which includes a pole shoe adjacent to the rotor receiving region, wherein the coil central axis is skewed with respect to the rotation axis.

10 Claims, 10 Drawing Sheets

STATOR WITH TEETH SKEWED FROM THE ROTATION AXIS

CROSS REFERENCE TO RELATED APPLICATIONS

This application is based on and claims priority to German Patent Application DE 10 2022 122 468.6, filed on Sep. 5, 2022, and German follow-up patent application DE 10 2023 123 166.9, filed on Aug. 29, 2023, the disclosure of which are incorporated herein by reference.

STATE OF THE ART

The invention relates to a stator, to a method for assembly of such a stator and to an electric machine having such a stator.

An electric actuator is known from U.S. Pat. No. 8,339, 003 B2 having a stator with an asymmetrical coil arrangement. All coil axes are radial axes with respect to a rotation axis of a rotor of the actuator.

It is the object of the present invention, in particular, to provide a generic stator with improved properties in view of cost effectiveness and/or ease of assembly. The object is achieved according to the present invention while advantageous embodiments and further developments of the invention can be derived from the dependent claims.

Advantages of the Invention

The invention is based on a stator for an electric machine, comprising a stator pack, including a rotor receiving region configured to receive a rotor. The rotor is configured to be driven around a rotation axis within the rotor receiving region. The stator pack further includes at least one stator pole tooth including a pole shoe. The stator pole tooth is surrounded, in particular wound, by a coil surrounding a coil central axis and which is, in particular, part of the stator.

It is suggested that the coil central axis is skew with respect to the rotation axis. This can achieve, in particular, simplified assembly. In particular, cost effectiveness can be achieved with respect to reduced material cost.

In particular, the use of carry-over parts can be achieved during production. Furthermore, electric contacting can be simplified.

The stator is configured, in particular, to provide an alternating magnetic field configured to drive at least one magnetic component of the rotor. An "electric machine" is understood to mean, in particular, a machine configured for the conversion of electrical energy to mechanical energy and/or for the conversion of mechanical into electrical energy. In particular, the stator is configured for use in an electric motor, in particular a brushless DC motor.

A "stator pack" is understood to mean, in particular, a unit configured to conduct and/or to focus a magnetic field generated by one or more coils. For example, at least most, in particular at least 90%, advantageously at least 92%, preferably at least 95% of the stator pack consists of at least one ferromagnetic material, in particular of a least one soft-magnetic material. The stator pack consists, in particular, of stacked metal sheets electrically insulated with respect to each other.

Advantageously, the stator pack, in particular at least the stator pole tooth and the pole shoe, is configured to conduct a magnetic field generated by the coil into the rotor receiving region. The stator pole tooth can comprise at least two portions. A first portion of the stator pole tooth extends, in particular, along a coil central axis. A "coil central axis" is understood to be, in particular, an axis or straight line forming a geometric central axis of the coil. In particular, the coil central axis is an axis of symmetry of the coil. A second portion of the stator pole tooth extends between the first portion of the stator pole tooth and the pole shoe of the stator pole tooth. The second portion of the stator pole tooth magnetically connects the first portion of the stator pole tooth to the pole shoe of the stator pole tooth. The second portion of the stator pole tooth can be at an angle, in particular, with respect to the first portion of the stator pole tooth. The second portion of the stator pole tooth extends from an end of the first portion of the stator pole tooth towards the rotor receiving region. At an end of the second portion facing the rotor receiving region, the second portion of the stator pole tooth transitions to the pole shoe of the stator pole tooth. The first portion, the second portion and the pole shoe of the stator pole tooth are connected to each other in a magnetically conductive manner. The coil is fitted on the first portion, which extends along the coil central axis. In particular, the coil has a prism-shaped, for example rectangular, alternatively round or oval-shaped, cross-section, in particular with respect to the coil central axis.

That a first and a second component part of the stator pack are "magnetically conductively connected" should be understood to mean, in particular, that these components are arranged, dimensioned and advantageously mechanically connected in such a manner that at least 90%, advantageously at least 95%, preferably at least 99% of a magnetic flux present in the first component part is transmitted to the second component part.

That a coil central axis is "skew" with respect to the rotation axis is to be understood to mean, in particular, that a distance of the coil central axis to the rotation axis is at least 2 mm, for example at least 5 mm, and/or at least 10%, in particular at least 20%, advantageously at least 50%, of a diameter of the rotor receiving region transverse to the rotation axis and/or that the rotation axis and the coil axis do not intersect.

"Configured" should be understood to mean specially programmed, designed and/or equipped with. That an object is configured to fulfill a particular function should be understood to mean, in particular, that the object fulfills and/or executes this particular function in at least one application and/or operation state.

Furthermore, it is suggested that the stator pack includes at least one further stator pole tooth with a further pole shoe adjacent to the rotor receiving region. In particular, the further stator pole tooth, or the further pole shoe is arranged in direct neighborhood to the stator pole tooth, or the pole shoe, in the circumferential direction. For example, the pole shoe and the further pole shoe are directly mechanically connected to each other in the circumferential direction of the rotor receiving region. For example, the pole shoe and the further pole shoe are integrally formed. Advantageously, a connection of the pole shoe and the further pole shoe is a connection different from a magnetically conductive connection. In particular, adjacent pole shoes are arranged, dimensioned and advantageously mechanically connected in such a fashion that a maximum of 10%, advantageously a maximum of 5%, preferably a maximum of 1% of a magnetic flux present in one of the pole shoes, is transmitted to the adjacent pole shoe. For example, adjacent pole shoes have an interval that is smaller than 2 mm, in particular smaller than 1 mm and/or smaller than 10°, in particular smaller than 5° in relation to the arc length as seen from the rotation axis. The further stator pole tooth is surrounded by a further coil, which surrounds a further coil central axis and which is, in particular, part of the stator. In particular, the further stator pole tooth, over its entire length, extends along the further coil central axis of the further coil. The further coil central axis intersects with the rotation axis of the rotor receiving region, in particular orthogonally, and/or has a distance of less than 2 mm, preferably less than 1 mm from the rotation axis.

Preferably, the coil central axis and the further coil central axis are parallel to each other. This can achieve, in particular, easy assembly, space saving and/or material saving.

Furthermore, it is suggested that the stator pack includes at least one third stator pole tooth having a pole shoe adjacent to the rotor receiving region. The third stator pole tooth is surrounded by a third coil, which surrounds a third coil central axis and which is, in particular, part of the stator. The third coil central axis is, in particular, skew with respect to the rotation axis. The third stator pole tooth can comprise, in particular, at least two portions. A first portion of the third stator pole tooth extends, in particular, along the coil central axis of the third coil. A second portion of the third stator pole tooth extends between the first portion of the third stator pole tooth and the pole shoe of the third stator pole tooth. The second portion of the third stator pole tooth magnetically connects the first portion of the third stator pole tooth to the pole shoe of the third stator pole tooth. The second portion of the third stator pole tooth can be at an angle, in particular, with respect to the first portion of the third stator pole tooth. The second portion of the third stator pole tooth extends from one end of the first portion of the third stator pole tooth towards the rotor receiving region. At an end of the second portion facing the rotor receiving region, the second portion of the third stator pole tooth transitions to the pole shoe of the third stator pole tooth. The first portion, the second portion and the third portion of the stator pole tooth are magnetically connected to each other. The third coil is fitted on the first portion, which extends along the coil central axis of the third coil.

Advantageously, the stator pack has exactly three stator pole teeth provided with coils, the respective coil central axes thereof being parallel to each other. In particular, the three stator pole teeth are arranged directly adjacent to each other. This allows, in particular, efficient, in particular three-phase driving of the rotor, saving of space and/or saving of material. For example, a small mass of the stator pack can be achieved.

Preferably, intervals between stator pole teeth provided with coils are free of parts of the stator pack and/or parts integrally formed therewith. In particular, intervals between stator pole teeth provided with coils are free of winding-free stator pole teeth or auxiliary poles. This can achieve, in particular, a space saving and/or high efficiency.

Furthermore, it is suggested that the pole shoe, or each pole shoe, surrounds a maximum of 35°, in particular a maximum of 35°, advantageously a maximum of 25°, and/or at least 15°, in particular at least 20°, advantageously at least 25°, of the rotor receiving region, in particular when viewed from the rotation axis. In alternative embodiments it is conceivable that the pole shoe, or each pole shoe, surrounds more than 35°, preferably more than 45°, and preferably less than 75°, and particularly preferably less than 60° of the rotor receiving region.

Furthermore, it is suggested that the stator pack includes an annular portion, which at least partially surrounds the rotor receiving region, wherein an advantageous support of the rotor and/or an advantageous protection of the rotor and/or an advantageous drive torque transmission to the rotor can be achieved. The annular portion can be designed in the shape of part of a ring, in particular of a circular ring, wherein a transverse extension and/or thickness of the ring could vary as seen along the circumferential direction of the annular portion. The annular portion can be configured, together with an entirety of all pole shoes of the stator pack and with gaps between the pole shoes and the annular portion, as the case may be, to completely surround the rotor receiving region. For example, the annular portion surrounds, in particular in an uninterrupted manner, at least 170°, preferably at least 180°, and particularly preferably 230° of the rotor receiving region, thereby achieving particularly good support of the rotor and/or particularly advantageous protection of the rotor.

Preferably, the annular portion comprises a plurality of auxiliary poles adjacent to the rotor receiving region, thereby enabling improved transmission of a drive torque to the rotor. The number of auxiliary poles corresponds, in particular, to a multiple, in particular, double the number of stator pole teeth. In contrast to the stator pole teeth, the auxiliary poles are devoid of coils. In particular, the auxiliary poles extend radially toward the rotor receiving region. For example, auxiliary poles are spaced apart from adjacent auxiliary poles or pole shoes by at least the same arc length, in particular in relation to the rotation axis, as adjacent pole shoes from one another. Preferably, the auxiliary poles, at least in the circumferential direction, have the same extension, in particular the same arc length, with respect to the rotation axis, as the pole shoes, thus advantageously achieving uniform drive-torque transmission. Advantageously, all auxiliary poles of the annular portion and/or of the stator pack have at least essentially the same size at least in the circumferential direction.

That two values "are at least essentially the same" should here be understood to mean that the two values differ from each other by a maximum of 10%, for example by a maximum of 5%, preferably by a maximum of 1%. In an alternative embodiment it is also conceivable to dispense with auxiliary poles on the annular portion, thereby in particular enabling the reduction of a cogging torque.

Furthermore, the stator pack can have a back iron, which is configured to close a magnetic circuit. This can achieve, in particular, an efficient design. Advantageously, the back iron has a U-shape. The U-shaped back iron can be configured to embrace all coils of the stator. In particular, the back iron is configured to be in contact with and preferably be connected to the ends of the stator pole teeth facing away from the pole shoes in a magnetically conductive manner.

For example, the back iron comprises a first part and at least one second part. Preferably, the first part of the back iron is integrally formed with the annular portion.

In particular, the first part and the second part are configured to be connected with each other in an at least magnetically conductive manner, or are connected to each other at least in a magnetically conductive manner. This helps to achieve easy assembly, in particular. For example, the second part is connected with the first part at least in a form-fit manner. The first part and the second part can be configured—in particular including corresponding form-fitting elements—to be linked to a latch and/or snap connection. In addition, in particular, at least in a finally assembled state, the second part and the first part can be adhesively connected to each other, in particular adhesively glued or welded to each other.

In accordance with further embodiments, at least one of the stator pole teeth can be integrally formed with the second part of the back iron. Furthermore, at least one of the stator pole teeth can have a bipartite structure, wherein a first portion of the stator pole tooth is integrally formed with the annular portion and/or the pole shoe and a second portion of the stator pole tooth is integrally formed with the back iron, in particular the second part of the back iron.

In a further embodiment of the present invention, it is suggested that the annular portion has at least one break, which subdivides the annular portion into a first annular partial portion and at least one second annular partial portion. This helps to advantageously adapt overall imped-ance of the stator. In particular, it can be ensured that an influence of a transition from the first part of the back iron to the second part of the back iron on the overall impedance is overridden by an influence of the break on the overall impedance and becomes advantageously negligible. More-over, the break can help to create additional construction space for further components, in particular, for a shaft of the electric machine that is drivable by the rotor. This in turn can reduce the overall construction space requirement. The break can extend, for example, over at most 90°, over a maximum of 60°, or over at most 45°, of the rotor receiving region. In certain embodiments, the break can extend only over a maximum of 5° of the rotor receiving region. Making the break as small as possible, can advantageously keep a togging torque small.

In particular, the first annular partial portion surrounds, in particular in an uninterrupted fashion, at least 10°, prefer-ably at least 20°, and particularly advantageously at least 30°, and preferably at most 45°, of the rotor receiving region.

In particular, the second annular partial portion surrounds, in particular in an uninterrupted fashion, at least 10°, pref-erably at least 20°, and particularly advantageously at least 30°, and preferably at most 45°, of the rotor receiving region. The first annular partial portion and/or the second annular partial portion preferably comprise(s) at least one of the auxiliary poles. In particular, the break can be arranged between two auxiliary poles. Furthermore, it is conceivable for auxiliary poles of the first and/or second annular partial portion to have different extensions, in particular different arc lengths with respect to the rotation axis, at least in the circumferential direction.

Furthermore, a method for the assembly of an above-described stator is suggested. In particular, the stator pack is provided with the second part of the back iron disassembled. Furthermore, in particular structurally identical and/or pre-assembled, coils are provided, which are fitted onto the stator pole teeth from outside, in particular. Subsequently, the second part of the back iron is connected to the first part of the back iron to form the stator. This can advantageously achieve easy and/or rapid assembly of the stator. To improve durability and/or stability, the first and second parts of the back iron can be additionally adhesively glued and/or welded together.

Furthermore, an electric machine having a rotor compris-ing an above-described stator is proposed. The electric machine is formed, in particular, as a brushless DC motor. The rotor of the electric machine is formed, in particular, as a multi-pole permanent-magnet rotor.

DRAWINGS

Further advantages can be derived from the following description of the drawing figures. In the drawings, exem-plary embodiments of the invention are shown. The draw-ings, the description and the claims comprise numerous features in combination. The person of skill in the art will also contemplate the features in isolation, as the case may be, and arrange them in reasonable further combinations.

Figure 1:
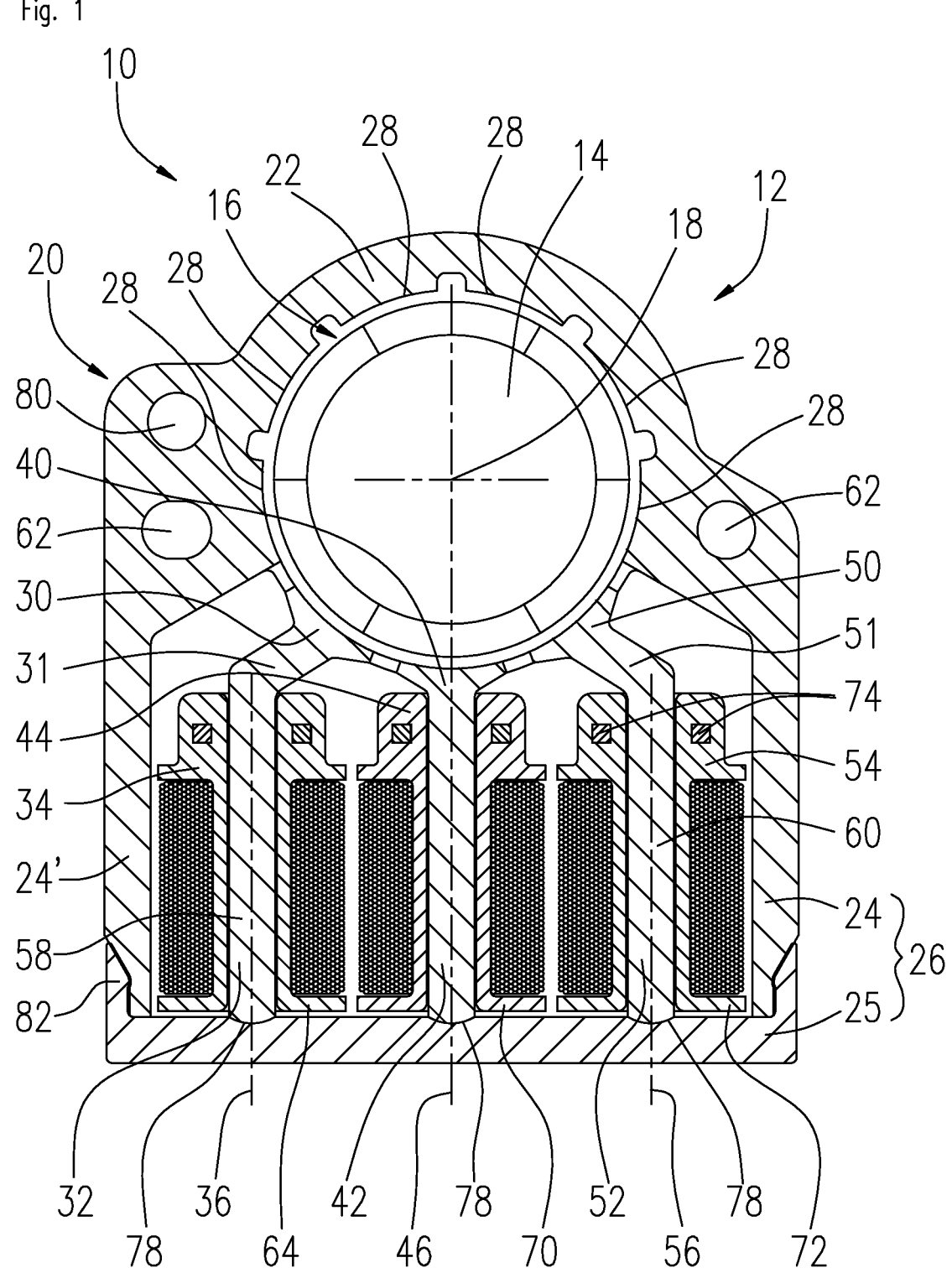
FIG. 1 shows an electric machine of the present invention comprising a stator according to the invention in a schematic sectional view.
Figure 9:
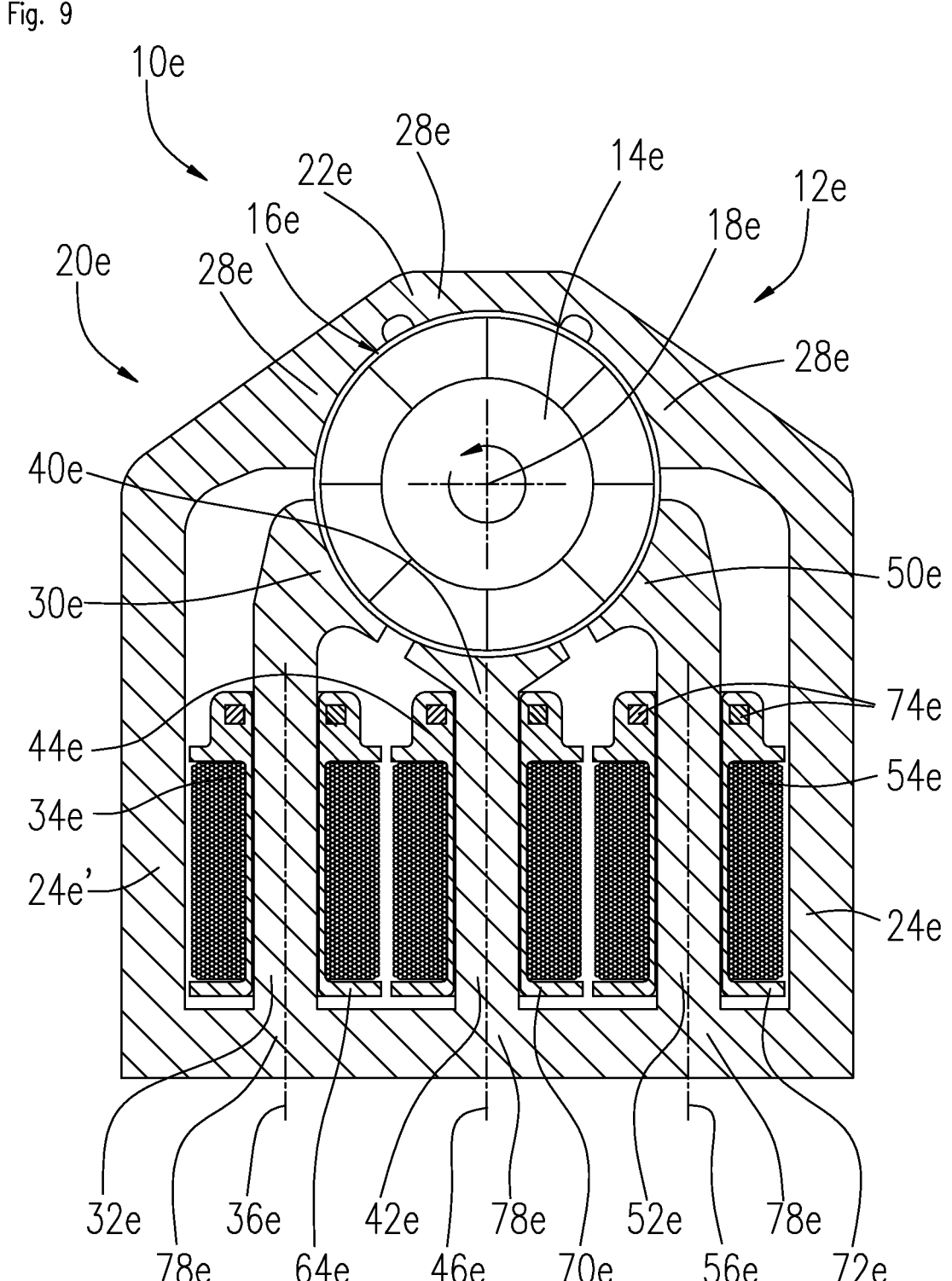
FIG. 9 shows an electric machine according to the inven-tion, comprising a stator according to the invention, includ-ing a reduced number of pole shoes in comparison to the exemplary embodiment of FIG. 1.
Figure 10:
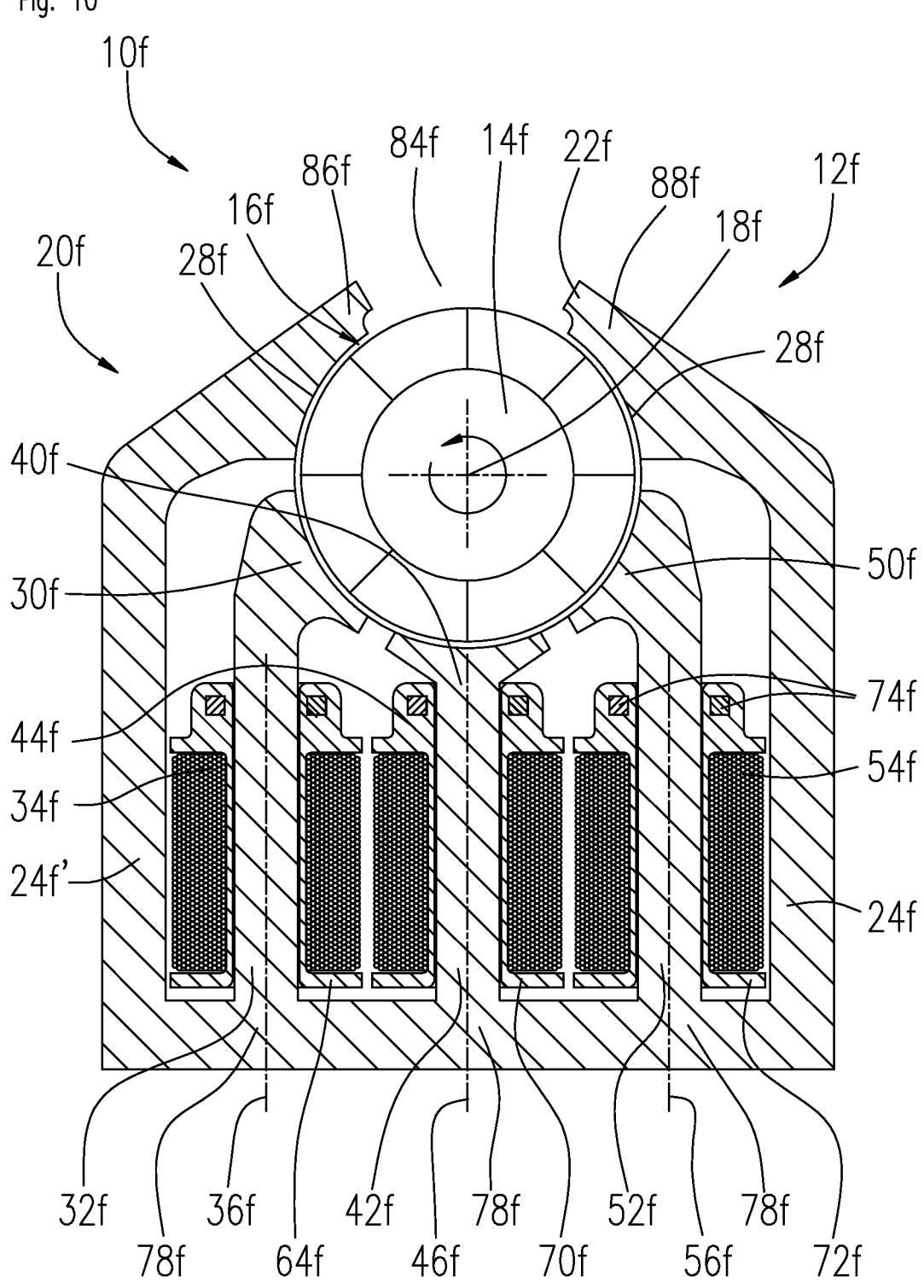
Figure 11:
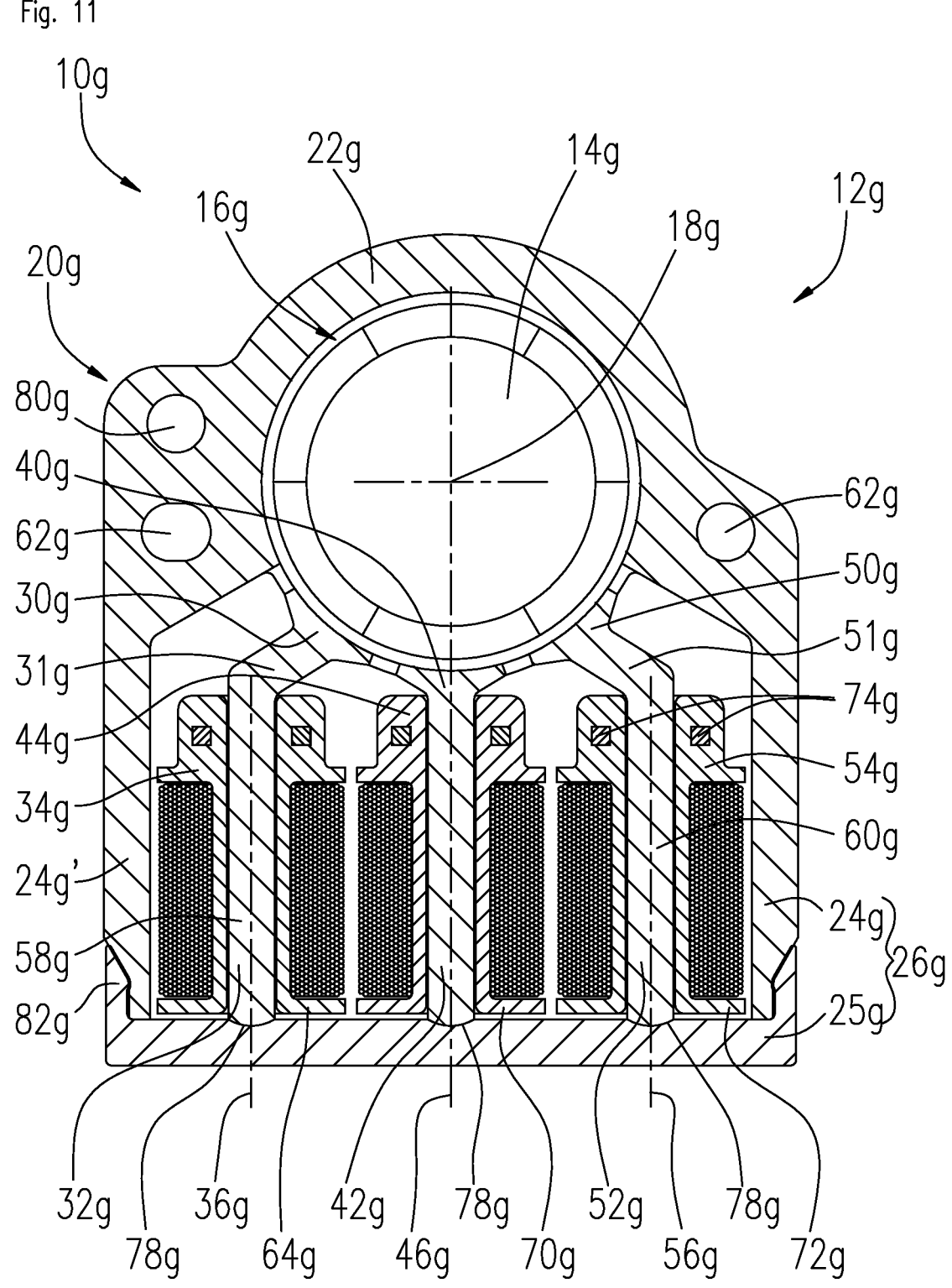

FIG. 10 shows an electric machine according to the invention, comprising a stator according to the invention, the annular portion of which includes a break in comparison to FIG. 9; and FIG. 11 shows an electric machine according to the invention, comprising a stator according to the invention, the annular portion of which is free of auxiliary poles in comparison to the exemplary embodiment of FIG. 1.

DESCRIPTION OF THE EXEMPLARY EMBODIMENTS

Figure 2:
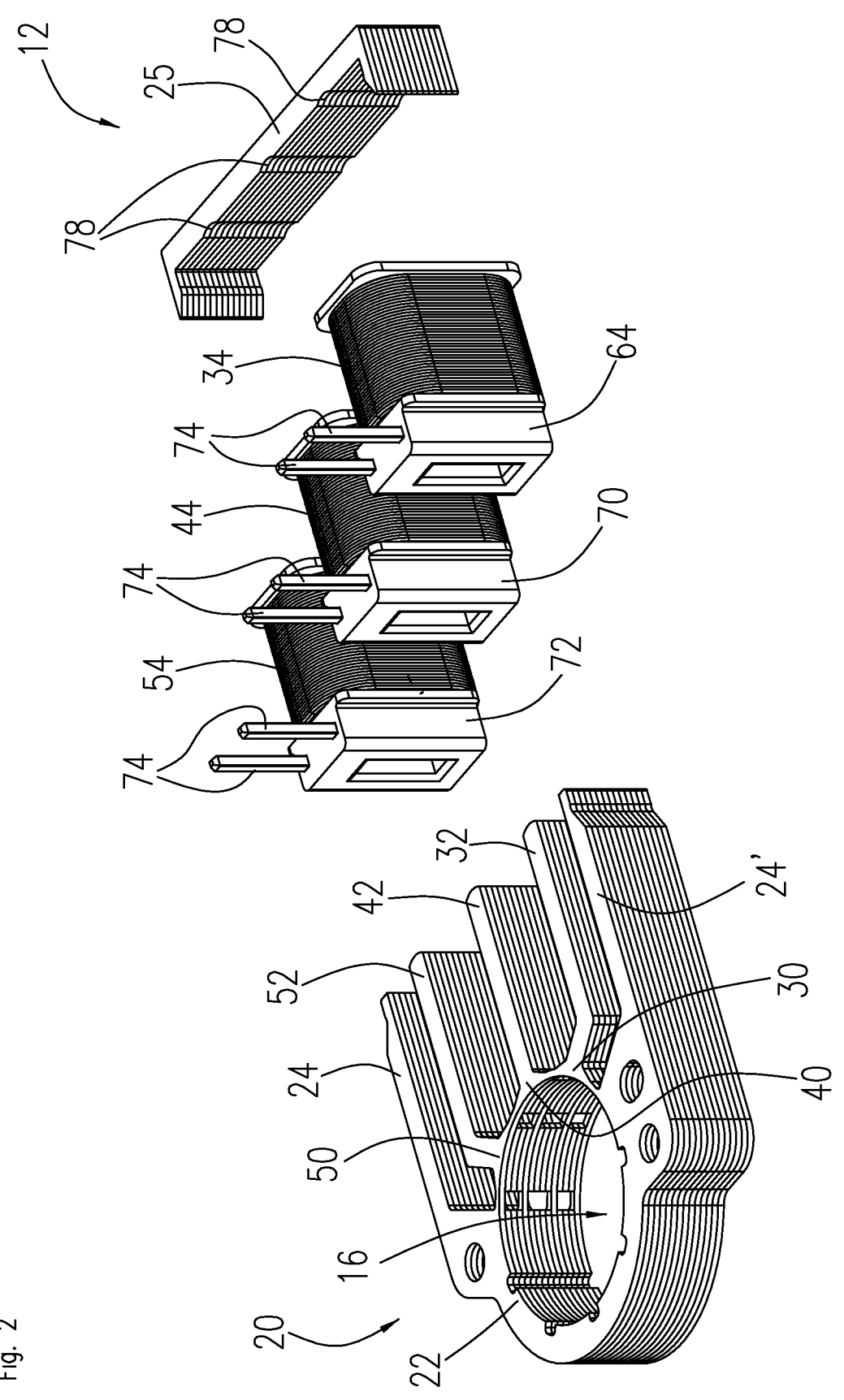
FIG. 2 shows the stator in accordance with FIG. 1 in a schematic exploded view.

FIGS. 1 and 2 show a first exemplary embodiment. FIG. 1 shows an electric machine 10 embodied as an electric motor, comprising a stator 12 and a rotor 14. The rotor 14 is realized, by way of example, as a six-pole permanent-magnet rotor. In the implementation of the stator 12 shown, use of a twelve-pole rotor is, however, also conceivable.

The stator 12 includes a rotor receiving region 16 con-figured to receive the rotor 14. The rotor 14 is configured to be driven around a rotation axis 18 (perpendicular to the drawing plane) within the rotor receiving region 16.

The stator 12 comprises a stator pack 20. The stator pack 20 comprises a stator pole tooth 32 having a pole shoe 30 adjacent to the rotor receiving region 16. The stator pack 20 comprises a further stator pole tooth 42 having a further pole shoe 40 adjacent to the rotor receiving region 16. The stator pack 20 comprises a third stator pole tooth 52 including a third pole shoe 50 adjacent to the rotor receiving region 16. The stator pole teeth 32, 42, 52 are arranged directly adjacent to each other. The pole shoes 30, 40, 50 have the same extension in the circumferential direction in relation to the rotor receiving region 16.

The stator pole tooth 32 is surrounded by a coil 34 surrounding a coil central axis 36. The stator pole tooth 32 comprises two portions 31, 58. A first portion 58 of the stator pole tooth 32 extends along the coil central axis 36. A second portion 31 of the stator pole tooth 32 connects the first portion 58 of the stator pole tooth 32 to the pole shoe 30 of the stator pole tooth 32. The second portion 31 of the stator pole tooth 32 is at an angle with respect to the first portion 58 of the stator pole tooth 32. Extending from the first portion 58 of the stator pole tooth 32, the second portion 31 of the stator pole tooth 32 extends towards the rotor receiving region 16. At an end of the second portion 31 facing the rotor receiving region 16, the second portion 31 of the stator pole tooth 32 transitions into the pole shoe 30 of the stator pole tooth 32. The stator 12 comprises the coil 34 surrounding the stator pole tooth 32. The coil 34 is fitted on the first portion 58 of the stator pole tooth 32 extending along the coil central axis 36 and surrounds it in the circumferential direction.

The further stator pole tooth 42 is surrounded by a further coil 44 surrounding a further coil central axis 46. The stator 12 comprises the further coil 44 surrounding the further stator pole tooth 42. The further stator pole tooth 42, over its entire length, extends along the further coil central axis 46. The further stator pole tooth 42, at its end facing the rotor receiving region 16, directly transitions into the further pole shoe 40.

The third stator pole tooth 52 is surrounded by a third coil 54 surrounding a third coil central axis 56. The stator 12 comprises the third coil 54 surrounding the third stator pole tooth 52. The third stator pole tooth 52 comprises two portions 51, 60. A first portion 60 of the third stator pole tooth 52 extends along the third coil central axis 36. A second portion 51 of the third stator pole tooth 52 connects the first portion 60 of the third stator pole tooth 52 to the pole shoe 50 of the third stator pole tooth 52. The second portion 51 of the third stator pole tooth 52 is at an angle with respect to the first portion 60 of the third stator pole tooth 52. Extending from the first portion 60 of the third stator pole tooth 52, the second portion 51 of the third stator pole tooth 52 extends towards the rotor receiving region 16. At an end of the second portion 31 facing the rotor receiving region 16, the second portion 51 of the third stator pole tooth 52 transitions into the pole shoe 50 of the third stator pole tooth 52. The stator 12 comprises the third coil 54 surrounding the third stator pole tooth 52. The third coil 54 is fitted on the first portion 60 of the third stator pole tooth 52 extending along the third coil central axis 56 and surrounds it in the circumferential direction.

The coil central axis 36 is skew with respect to the rotation axis 18. Furthermore, the third coil central axis 56 is also skew to the rotation axis 18. The further coil central axis 46 intersects with the rotation axis 18 of the rotor receiving region 16.

The coil central axis 36 and the further coil central axis 46 are parallel to each other. Furthermore, the third coil central axis 56 and the further coil central axis 46 are also parallel to each other.

The stator pack 20, having stator pole tooth 32, further stator pole tooth 42 and third stator pole tooth 52, comprises exactly three stator pole teeth 32, 42, 52. The exactly three stator pole teeth 32, 42, 52 are arranged directly adjacent to each other. The coil central axes 36, 46, 56 of the exactly three stator pole teeth 32, 42, 52 are parallel to each other.

A space between the coil 34 and the further coil 44 is free of parts of the stator pack 20. A space between the further coil 44 and the third coil 54 is free of parts of the stator pack 20.

The stator pack 20 comprises an annular portion 22 at least partially surrounding the rotor receiving region 16. The annular portion 22, in the present example, surrounds about 240° of the rotor receiving region 16 without break, in particular in relation to the rotation axis 18. The pole shoes 30, 40, 50 are arranged in the circumferential direction of the rotor receiving region 16 with interposed grooves in succession, in particular adjacent to each other. Together, the pole shoes 30, 40, 50 surround a little less than 120° of the rotor receiving region 16, in particular in relation to the rotation axis 18. The annular portion 22 and the pole shoes 30, 40, 50, together with grooves between the pole shoes 30, 40, 50 and between the pole shoes 30, 40, 50 and the annular portion 22, surround the entire rotor receiving region 16. The annular portion 22 thus surrounds about double the arc length of the pole shoes 30, 40, 50 taken together.

The annular portion 22 comprises a plurality of auxiliary poles 28. A number of the auxiliary poles 28 corresponds to a multiple of, in the present example double, the number of pole shoes 30, 40, 50, three in the present example. The annular portion 22 comprises six auxiliary poles 28. The auxiliary poles 28 are adjacent to the rotor receiving region 16. All auxiliary poles 28 have the same size at least in the circumferential direction in relation to the rotor receiving region 16. The auxiliary poles 28 are separated from each other by grooves arranged between the individual auxiliary poles 28.

The stator pack 20 includes a back iron 26 configured to close a magnetic circuit. The back iron 26 includes a first part 24, 24', which is integrally formed with the annular portion 22. The back iron 26 includes a second part 25, which is connected to the first part 24, 24' in a magnetically conductive manner. The first part 24, 24' and the second part 25 each comprise form-fitting elements, which are configured to connect the second part 25 to the first part 24, 24' in a form-fitting manner. The first part 24, 24' and the second part 25 are connected to each other by means of a snap connection 82. The first part 24, 24' is formed as two webs extending in parallel from the annular portion 22 to the stator pole teeth 32, 42, 52. The second part 25 comprises grooves 78 into which the ends of the stator pole teeth 32, 42, 52 protrude in the assembled state.

The stator pack 20 can further include mounting elements 62, in particular holes. In particular, these mounting elements 62 are for attaching and/or positioning, in particular on a printed circuit board or a motor housing. The stator pack 20 can also comprise a recess 80 for receiving an earth contact.

Figure 3:
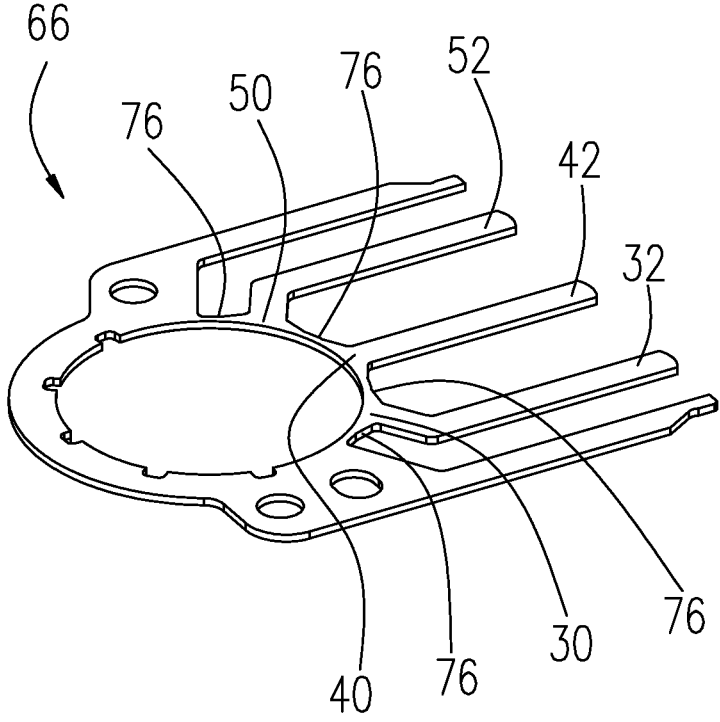
FIG. 3 shows a metal sheet layer of the stator according to FIGS. 1 and 2, wherein the stator pole teeth are connected to each other.
Figure 4:
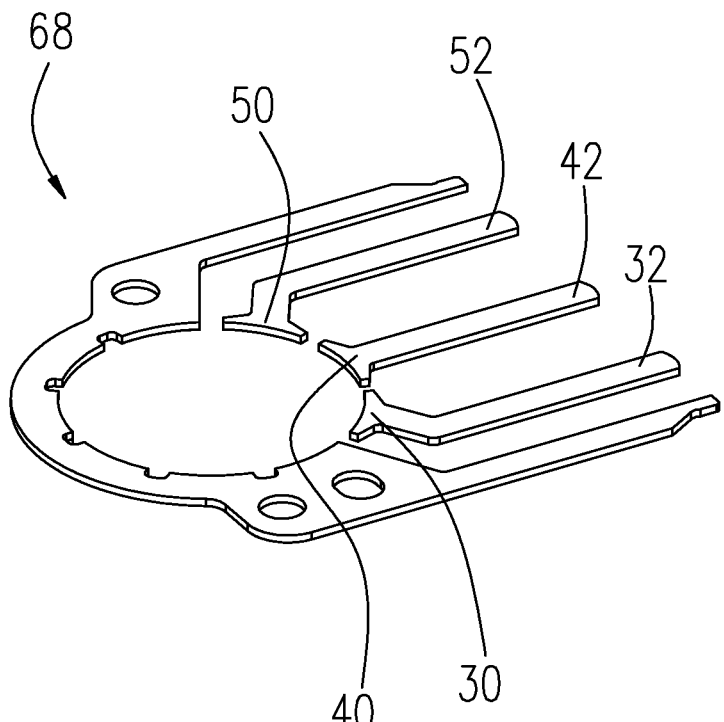
FIG. 4 shows a metal sheet layer of the stator according to FIGS. 1 and 2, wherein the stator pole teeth are embodied as individual metal sheets.

During manufacture and/or assembly of the stator 12, first the stator pack 20 is made. The stator pack 20 is made of stamped metal sheet parts, which are stacked onto each other and adhesively glued, in particular by means of a bonding varnish, or die-cut packaged (cf. FIG. 2). To achieve this, a small number of contiguous metal sheet layers 66, in which the pole shoes 30, 40, 50 are connected with each other, or the outer pole shoes 30, 50 are connected to adjacent auxiliary poles 28 by means of metal sheet webs 76 (cf. FIG. 3), in combination with a larger number of metal sheet layers 68, in which the stator pole teeth 32, 42, 52 are realized as individual metal sheets, which are not, in particular not magnetically, connected among each other, or with one of the auxiliary poles 28, in the region of the pole shoes 30, 40, 50 (cf. FIG. 4). In particular, at least the outermost metal sheet layers of the stator pack 20 are realized as contiguous metal sheet layers 66. In addition, some individual inner metal sheet layers of the stator pack 20 can also be realized as contiguous metal sheet layers 66. By combining of contiguous metal sheet layers 66 with metal sheet layers 68 in which the stator pole teeth 32, 42, 52 are formed as individual metal sheets, a mechanically solid, but magnetically poorly conductive connection between neighboring pole shoes 30, 40, 50 is achieved. Subsequently, the stack can be brought into its final shape by means of a parting method, in particular by means of water jet cutting, laser cutting or wire erosion. In particular, the stack is subdivided into two component parts—the second part 25 of the back iron 26 and the first part 24, 24' of the back iron 26, which is integrally formed with the stator pole teeth 32, 42, 52, the pole shoes 30, 40, 50 and the annular portion 22. Alternatively, the component parts can also be manufactured independently from one another.

Subsequently, the pre-assembled carry-over identical coils 34, 44, 54 are fitted from the outside, as seen from the rotor receiving region 16, onto the stator pole teeth 32, 42, 52. The coils 34, 44, 54 each have a coil body 64, 70, 72. The coil bodies 64, 70, 72 consist of an electrically insulating material, in particular, are at least essentially of a plastic material. The coil bodies 64, 70, 72 are configured to electrically insulate a winding wire of the coils 34, 44, 54 from the stator pole teeth 32, 42, 52. The coil bodies 64, 70, 72 also support contact pins 74 to achieve electric contacting of the coils 34, 44, 54. The parallel arrangement of the stator pole teeth 32, 42, 52 and the parallel arrangement of the coils 34, 44, 54 achieved thereby allows the contact pins 74 to be arranged along a straight line thus advantageously achieving contacting and/or connecting of the coils 34, 44, 54. Subsequently, the second part 25 of the back iron 26 is connected to the first part 24, 24' of the back iron 26 in a form-fitting manner.

FIGS. 5 to 11 illustrate further exemplary embodiments of the invention. The following descriptions will be essentially limited to the differences between the exemplary embodiments wherein, with regard to components, features and functions that remain the same, the description of the exemplary embodiment of FIGS. 1 to 4 can serve as a reference. To differentiate between the exemplary embodiments, the reference numerals of the embodiments according to FIGS. 5 to 11 have the letters "a" to "g" appended to them. Regarding components bearing the same name, in particular regarding components having the same reference numerals, the drawings and/or the description of the exemplary embodiment of FIGS. 1 to 4 can be referred to.

Figure 5:
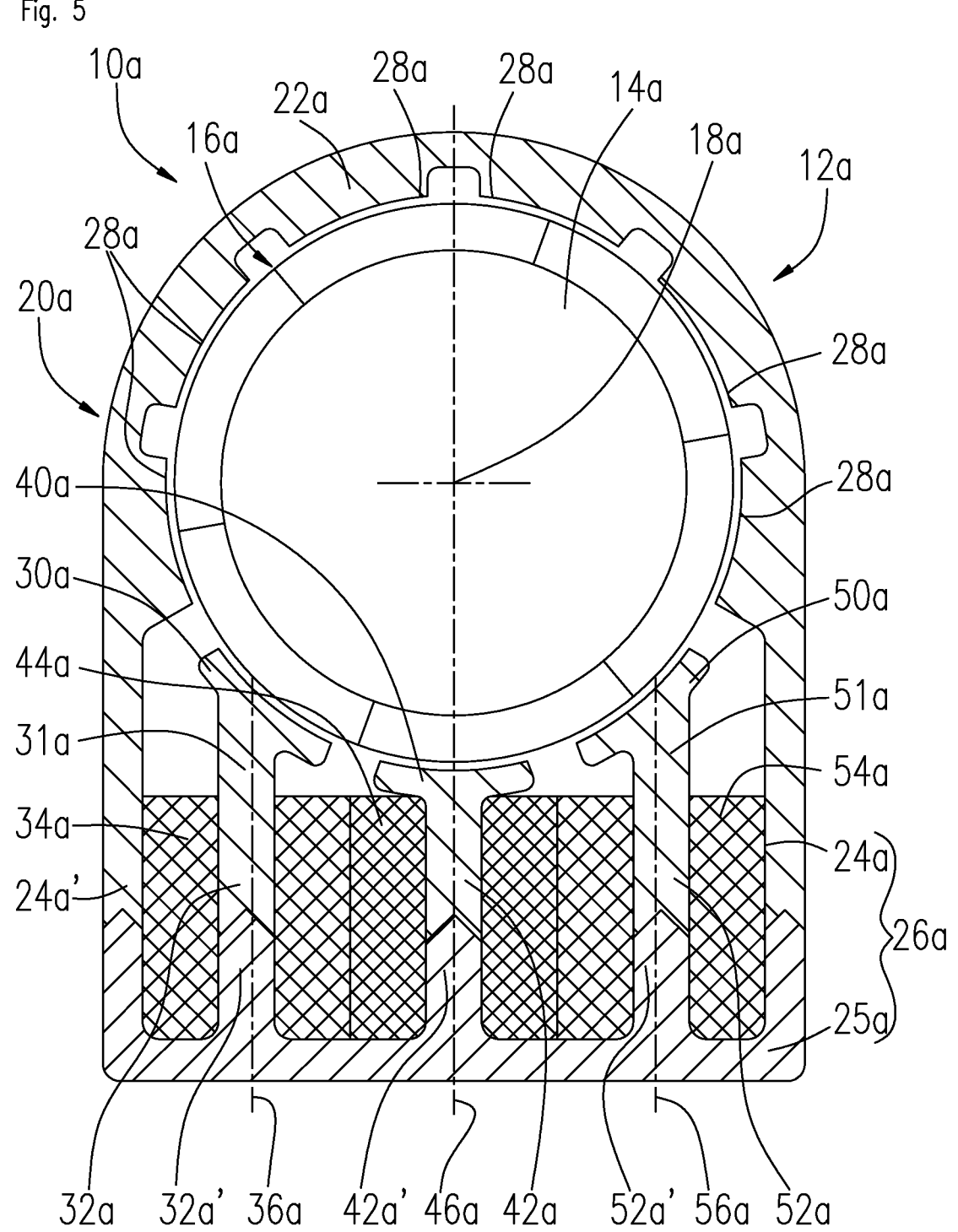
FIG. 5 shows an electric machine according to the present invention, comprising a stator according to the invention in a schematic view.

FIG. 5 shows an electric machine 10a embodied as an electric motor, comprising a stator 12a and a rotor 14a. The stator 12a has a stator pack 20a. The stator pack 20a comprises a subdivided stator pole tooth 32a, 32a'. A first part of the stator pole tooth 32a is integrally formed with a pole shoe 30a. A second part of the stator pole tooth 32a' is integrally formed with a second part 25a of a back iron 26.

The stator pack 20a comprises a further subdivided stator pole tooth 42a, 42a'. A first portion of the further stator pole tooth 42a is integrally formed with a pole shoe. A second portion of the further stator pole tooth 42a' is integrally formed with a second part 25a of a back iron 26a.

The stator pack 20a comprises a third subdivided stator pole tooth 52a, 52a'. A first portion of the third stator pole tooth 52a is integrally formed with a pole shoe 50a. A second portion of the third stator pole tooth 52a' is integrally formed with a second part 25a of a back iron 26a.

Furthermore, embodiments are conceivable in which at least one of the stator pole teeth or all of the stator pole teeth is/are integrally formed with the second part of the back iron. Mixed embodiments of the above-presented embodiments are also conceivable.

Furthermore, embodiments having more or fewer than three stator pole teeth are also conceivable. A number of the auxiliary poles, pole shoes and coils will then be adapted correspondingly.

Figure 6:
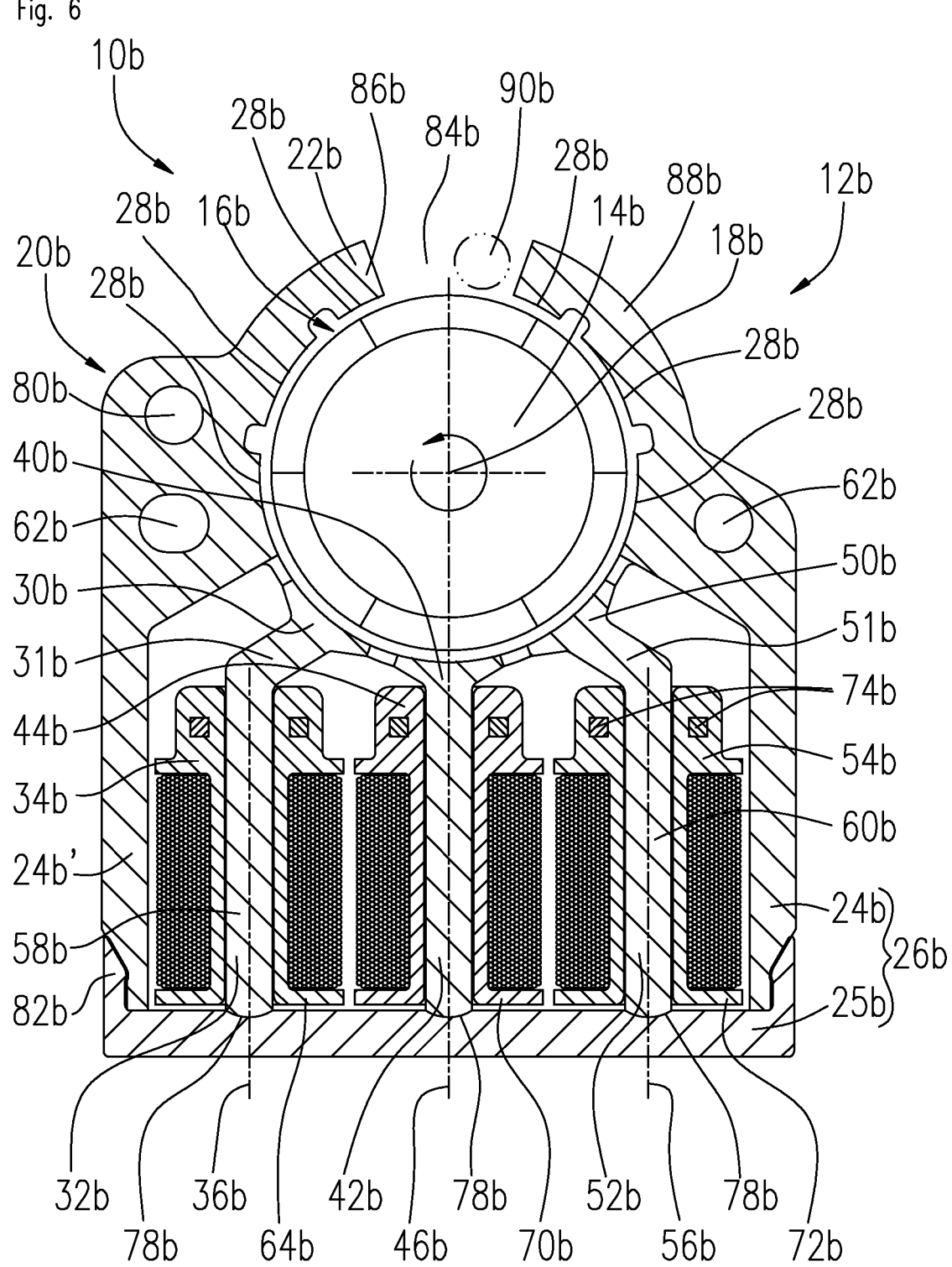
FIG. 6 shows an electric machine according to the inven-tion, comprising a stator according to the invention, the annular portion of which includes a break.
Figure 7:
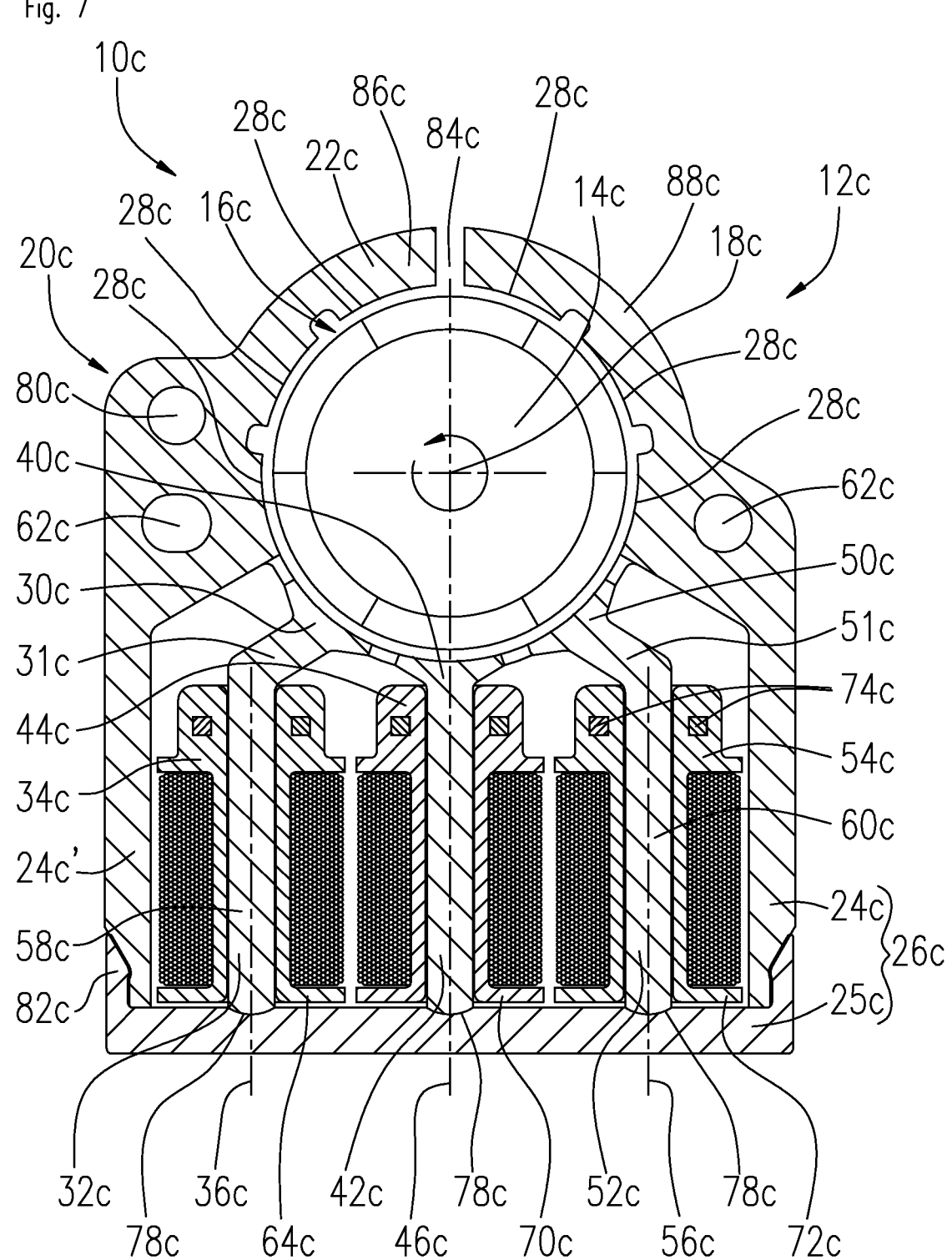
FIG. 7 shows an electric machine according to the inven-tion, comprising a smaller break in an annular portion than the one in FIG. 6.
Figure 8:
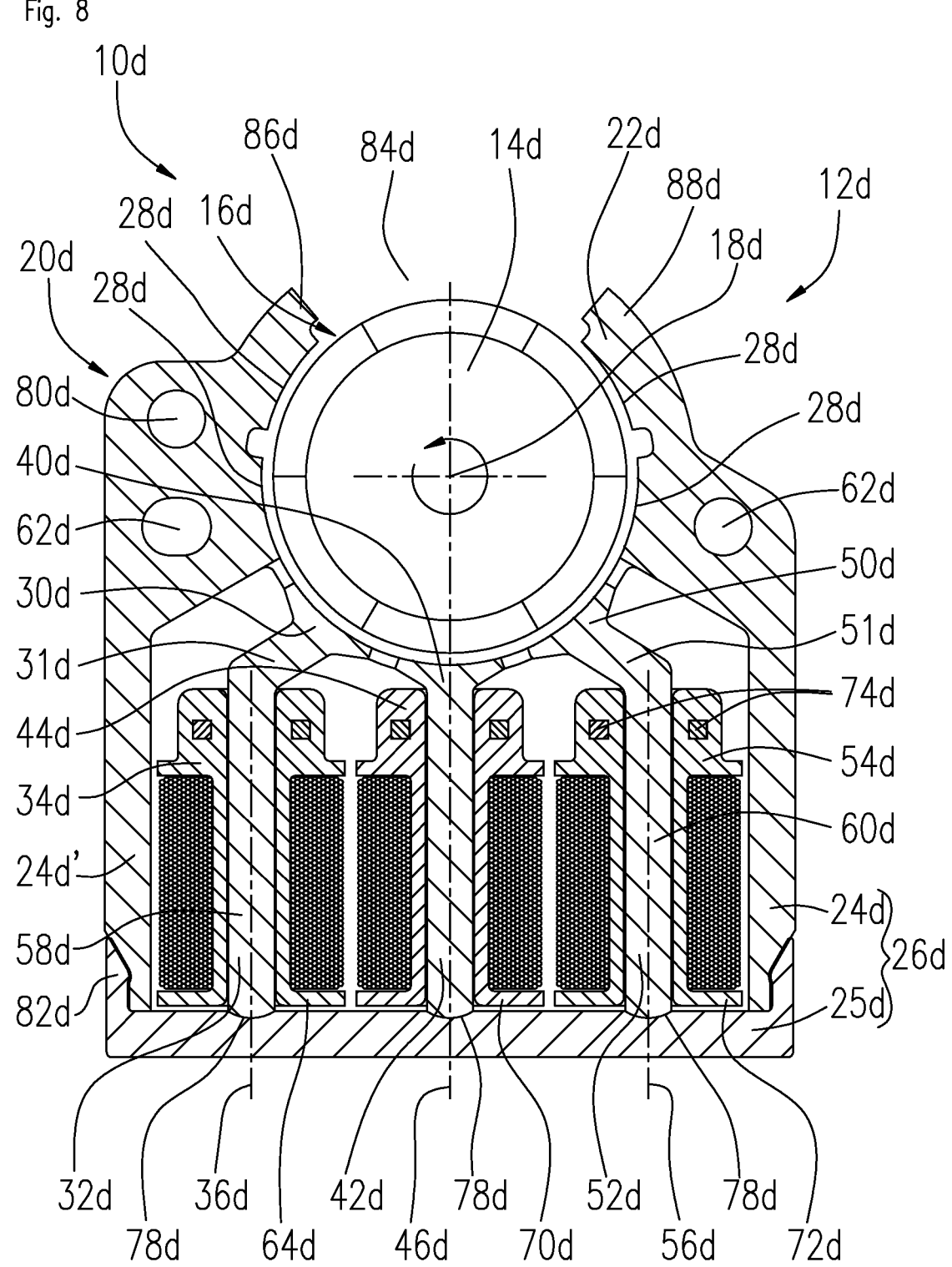
FIG. 8 shows an electric machine according to the inven-tion, comprising a larger break in an annular portion than the one in FIG. 6.

FIGS. 6, 7 and 8 show further electric machines 10b, 10c, 10d realized as electric motors, the annular portions 22b, 22c, 22d of which each have breaks 84b, 84c, 84d when compared to FIGS. 1 to 4, which subdivide the respective annular portion 22b, 22c, 22d into a first annular partial portion 86b, 86c, 86d and a second annular partial portion 88b, 88c, 88d. The breaks 84b, 84c, 84d allow an overall impedance to be advantageously adapted, wherein, in particular, an influence of a transition from a first part 24b, 24c, 24d to a second part 25b, 25c, 25d of a back iron 26b, 26c, 26d on the overall impedance can be minimized. In addition, additional construction space can be created in the break 84b, 83c, 84d, for example, for a shaft (not shown) driven by the rotor 14b, 14c, 14d, or a fixed shaft 90b (cf. FIG. 6) on which a transmission gear is mountable.

The breaks 84b, 84c, 84d have different sizes. The break 84c in FIG. 7, for example, is smaller than the break 84b in FIG. 6 and is placed precisely between two auxiliary poles 28c. The break 84d in FIG. 8, for example, is larger than the break 84b in FIG. 6, wherein two auxiliary poles 28c are missing when compared to the implementation of FIG. 7. In the implementation according to FIG. 6, two auxiliary poles 28b adjacent to the break 84b are made smaller by the break 84b in comparison to the remaining auxiliary poles 28b.

The smaller the break 84b, 84c, 84d, the smaller is a cogging torque which, on the one hand, is desirable. The larger the break 84b, 84c, 84d, however, the larger the additional construction space that becomes available, which can simplify assembly, in particular. The choice of size of the break 84b, 84c, 84d will depend on the respective application.

FIGS. 9 and 10 show further electric machines 10e, 10f realized as electric motors having a reduced number of poles in comparison to the exemplary embodiments of FIGS. 1 to 8, that is a reduced overall number of pole shoes 30e, 30f, 40e, 40f, 50e, 50f and auxiliary poles 28e, 28f. Moreover, the rotors 14e, 14f, in the present example, have eight magnetic poles, while the rotors 14, 14a, 14b, 14c, 14d of the previous exemplary embodiments only have six magnetic poles.

While a number of poles in the exemplary embodiments of FIGS. 1 to 7 is nine and, in the exemplary embodiments of FIG. 8, is seven, the exemplary embodiment of FIG. 9 has only six poles and the exemplary embodiment of FIG. 10 has only five poles.

An annular portion 22f of the exemplary embodiment of FIG. 10 has a break 84f having an angular extension which corresponds precisely to one of the auxiliary poles 28e of FIG. 9.

By reducing the number of poles, the pole shoes 30e, 30f, 40e, 40f, 50e, 50f extend over an angular region of approximately 180° about a rotor receiving region 16e, 16f.

FIG. 11 shows an exemplary embodiment which essentially corresponds to the exemplary embodiment of FIGS. 1 to 4, wherein an annular portion 22g according to FIG. 11 is free of auxiliary poles 28. This can advantageously reduce a cogging torque.

The invention claimed is:

1. A method for assembly and/or manufacture of a stator for an electric machine, the stator comprising
   a stator pack including
      a rotor receiving region for receiving a rotor configured
         to be driven around a rotation axis within the rotor
         receiving region, and including at least one stator pole tooth
  which is surrounded by a coil surrounding a coil central axis and
  which includes a pole shoe adjacent to the rotor receiving region,
wherein the coil central axis is skewed with respect to the rotation axis,
wherein the stator pack includes an annular portion partially surrounding the rotor receiving region,
wherein the stator pack includes a back iron configured to close a magnetic circuit and including a first part and at least one second part connected to the first part,
wherein the first part of the back iron is integrally formed with the annular portion and the at least one second part of the back iron is connected to the first part at least in a form-fit manner,
wherein the stator pack includes at least one further stator pole tooth with a further pole shoe,
wherein the at least one further stator pole tooth is surrounded by a further coil surrounding a further coil central axis,
wherein the further coil central axis intersects with the rotation axis,
wherein the coil central axis and the further coil central axis are parallel to each other,
wherein the stator pack includes at least one third stator pole tooth with a third pole shoe,
wherein the at least one third stator pole tooth is surrounded by a third coil surrounding a third coil central axis,
wherein the third coil central axis is skewed with respect to the rotation axis, and
wherein the stator pack includes exactly three stator pole teeth provided with coils, respective coil central axes thereof being parallel to each other,
the method comprising:
(a) providing the stator pack with the back iron comprising the first part and the at least one second part, the at least one second part being disassembled, the first part of the back iron being integrally formed with the annular portion;
(b) providing pre-assembled and/or identical coils as the coil, the further coil, and the third coil;
(c) fitting the pre-assembled and/or identical coils, as viewed from the rotor receiving region, from outside onto the at least one stator pole tooth, the at least one further stator pole tooth, and the at least one third stator pole tooth; and
(d) subsequently connecting the at least one second part of the back iron to the first part of the back iron to form the stator, at least in a form-fit manner.
2. The method for assembly and/or manufacture of the stator for the electric machine according to claim 1, wherein spaces between stator pole teeth provided with coils are free of parts of the stator pack.
3. The method for assembly and/or manufacture of the stator for the electric machine according to claim 1,
wherein the pole shoe surrounds a maximum of 35° of the rotor receiving region.
4. The method for assembly and/or manufacture of the stator for the electric machine according to claim 1,
wherein the annular portion surrounds at least 180° of the rotor receiving region.
5. The method for assembly and/or manufacture of the stator for the electric machine according to claim 1,
wherein the annular portion includes a plurality of auxiliary poles adjacent to the rotor receiving region.
6. The method for assembly and/or manufacture of the stator for the electric machine according to claim 5,
wherein all the plurality of auxiliary poles have at least essentially a same size in a circumferential direction.
7. The method for assembly and/or manufacture of the stator for the electric machine according to claim 5,
wherein the plurality of auxiliary poles, in a circumferential direction, have at least essentially a same size as the pole shoe of the at least one stator pole tooth.
8. A stator for an electric machine, comprising
a stator pack including
  a rotor receiving region for receiving a rotor configured to be driven around a rotation axis within the rotor receiving region, and including
  at least one stator pole tooth
    which is surrounded by a coil surrounding a coil central axis and
    which includes a pole shoe adjacent to the rotor receiving region,
wherein the coil central axis is skewed with respect to the rotation axis,
wherein the stator pack includes an annular portion partially surrounding the rotor receiving region,
wherein the stator pack includes a back iron configured to close a magnetic circuit and including a first part and at least one second part connected to the first part,
wherein the first part of the back iron is integrally formed with the annular portion and the at least one second part of the back iron is connected to the first part at least in a form-fit manner, and
wherein the annular portion has at least one break subdividing the annular portion into a first annular partial portion and at least one second annular partial portion.
9. An electric machine, comprising
the stator according to claim 8, including the rotor.
10. The electric machine according to claim 9,
wherein the rotor is formed as a permanent magnet rotor.

* * * * *